(12) United States Patent
Go

(10) Patent No.: US 9,376,844 B2
(45) Date of Patent: Jun. 28, 2016

(54) GLIDING DOORSTOP

(71) Applicant: Eileen Go, Sebastopol, CA (US)

(72) Inventor: Eileen Go, Sebastopol, CA (US)

( * ) Notice: Subject to any disclaimer, the term of this patent is extended or adjusted under 35 U.S.C. 154(b) by 0 days.

(21) Appl. No.: 14/933,943

(22) Filed: Nov. 5, 2015

(65) Prior Publication Data

US 2016/0130848 A1    May 12, 2016

Related U.S. Application Data

(60) Provisional application No. 62/077,120, filed on Nov. 7, 2014.

(51) Int. Cl.
*E05B 39/02* (2006.01)
*E05C 17/54* (2006.01)
*E05C 19/18* (2006.01)

(52) U.S. Cl.
CPC .............. *E05C 17/54* (2013.01); *E05C 19/188* (2013.01)

(58) Field of Classification Search
CPC ............................... E05C 19/188; E05C 17/54
USPC ................... 16/82, 86 R, 86 A, 86 B
See application file for complete search history.

(56) References Cited

U.S. PATENT DOCUMENTS

| | | | | |
|---|---|---|---|---|
| 171,807 A * | 1/1876 | Hoffman | ............... | E05C 17/54 16/86 A |
| 1,064,760 A * | 6/1913 | Nielsen | ............... | E05C 17/54 292/288 |
| 1,876,881 A * | 9/1932 | Durant | ............... | E05C 17/54 16/82 |
| 2,120,692 A * | 6/1938 | Butts | ............... | E05C 17/54 16/86 A |
| 2,703,728 A * | 3/1955 | Raber | ............... | E05C 17/54 292/288 |
| 4,044,424 A * | 8/1977 | Sasgen | ............... | E05C 17/54 16/85 |
| 4,747,371 A | 5/1988 | Leopold | | |
| 5,331,719 A * | 7/1994 | Hum | ............... | E05C 17/54 16/85 |
| 5,547,238 A | 8/1996 | Payette | | |
| 2005/0235561 A1* | 10/2005 | Bushey | ............... | E06B 7/28 49/70 |
| 2006/0163888 A1 | 7/2006 | Bowser | | |
| 2009/0302622 A1* | 12/2009 | Fritz | ............... | E05C 17/52 292/343 |
| 2010/0242226 A1* | 9/2010 | Hopkins | ............... | E05C 17/54 16/82 |
| 2010/0289280 A1* | 11/2010 | Nadrowski | ............... | E05C 17/54 292/343 |
| 2011/0062729 A1* | 3/2011 | Ruggerio | ............... | E05C 17/54 292/343 |
| 2011/0296650 A1* | 12/2011 | Liu | ............... | E05C 17/54 16/82 |
| 2014/0251230 A1* | 9/2014 | Go | ............... | A01K 13/004 119/706 |
| 2014/0345083 A1* | 11/2014 | Mackay | ............... | E05C 17/44 16/85 |

* cited by examiner

*Primary Examiner* — Hanh V Tran
(74) *Attorney, Agent, or Firm* — West & Associates, A PC; Stuart J. West; Shaun N. Sluman

(57) ABSTRACT

A gliding doorstop having a substantially sinusoidal cross sectional shape, with a central trough configured to accept the bottom of a door and two curved ends configured to slide along a floor. The gliding doorstop is configured to retain the door in a set position against routine amounts of environmental forces, but be slideable such that the door can be manually moved by a user into a new set position without removing the gliding doorstop from underneath the door.

13 Claims, 7 Drawing Sheets

GLIDING DOORSTOP

CLAIM OF PRIORITY

This Application claims priority under 35 U.S.C. §119(e) from earlier filed U.S. Provisional Application Ser. No. 62/077,120, filed Nov. 7, 2014, which is hereby incorporated by reference.

BACKGROUND

1. Field of the Invention

The present disclosure relates to the field of doorstops, particularly a gliding doorstop with a substantially sinusoidal cross sectional shape that allows a door to be manually moved with the gliding doorstop in place underneath the door.

2. Background

Doorstops are commonly used to hold doors in place and/or prevent them from closing. For example, doorstops can be used with doors that are otherwise configured to close automatically in order to keep the doors open during business hours or when high traffic is expected. Doorstops can also be used with doors to keep them fully or partially open, and/or prevent movement of the doors due to wind or impacts from passersby.

However, most doorstop designs require that the doorstop be entirely removed from underneath a door to allow the door to be moved. For example, most conventional doorstops are wedge-shaped, with the wedge's smaller end fitting underneath the door and the larger end being positioned in front of or behind the door. With these types of doorstops, even slightly moving the door requires a user to remove the wedge from under the door, reposition the door, and replace the wedge under the door to keep it in its new position. It can be physically inconvenient for users to bend over to move conventional doorstops, or to kick them in or out of position.

Additionally, conventional doorstops are often used only to keep doors fully or partially opened, and are entirely removed when the doors are closed. A removed doorstop must then be stored elsewhere, or left on the floor near the door so the doorstop can be used when needed again in the future. However, doorstops can be easily misplaced when stored away from the doors they are intended to be used with, and leaving unused doorstops on the floor can create tripping hazards.

What is needed is a gliding doorstop that can remain positioned under a door at all times, and be configured to prevent unintentional movement of the door while also allowing the door to be manually moved to a new set position while the gliding doorstop is in place under the door. When installed under a door, such a gliding doorstop should be able to provide enough frictional resistance to prevent unwanted movement of the door due to normal amounts of wind or other elements, but be slideable such that a human user can overcome the gliding doorstop's frictional resistance and move the door to a new position.

DETAILED DESCRIPTION

Figure 1A:
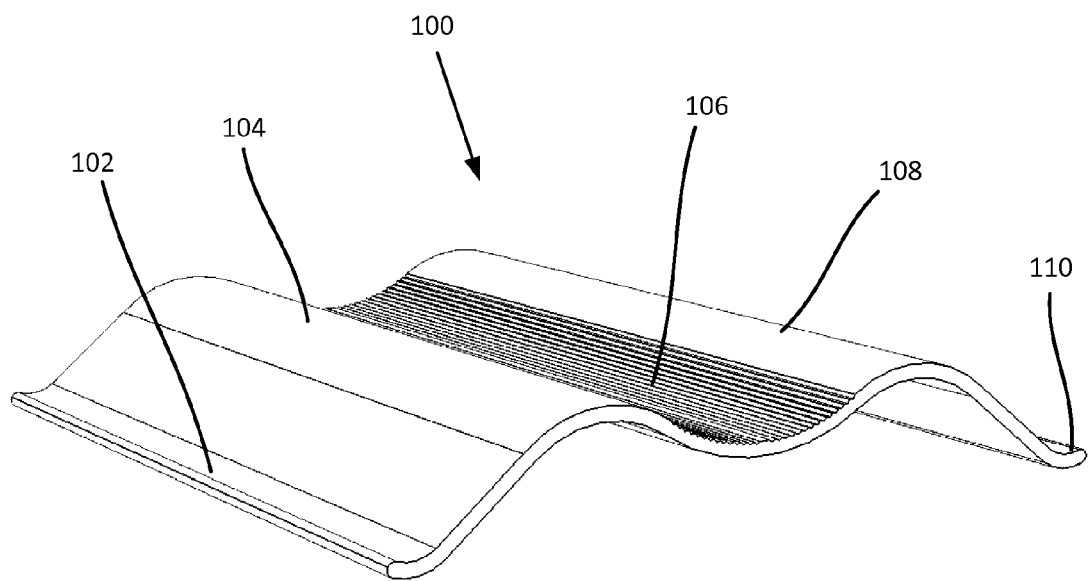
FIG. 1A depicts a perspective view of an embodiment of a gliding doorstop.
Figure 1B:
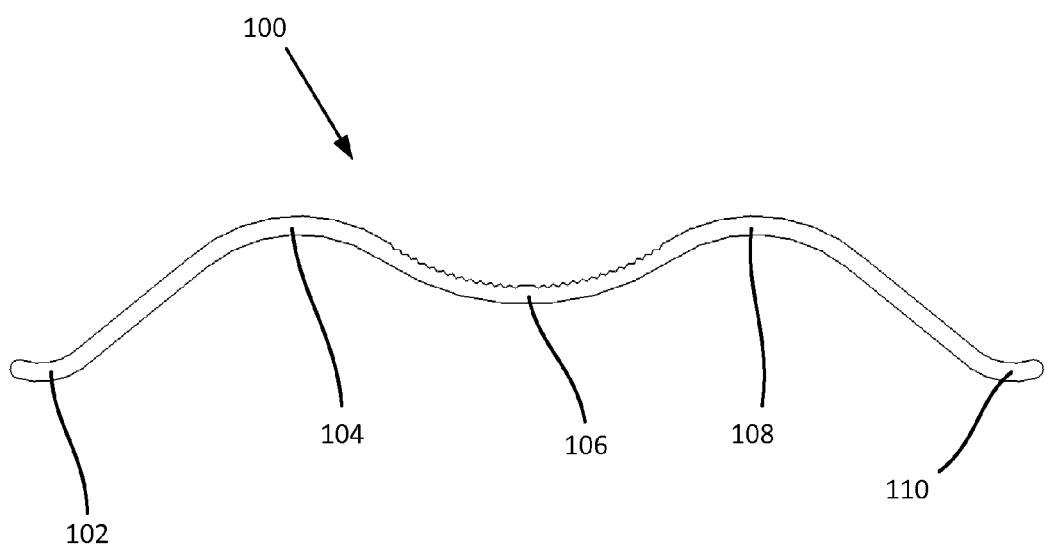
FIG. 1B depicts a side view of an embodiment of a gliding doorstop.

FIG. 1A and 1B respectively depict a perspective view and a side view of an exemplary embodiment of a gliding doorstop 100. A gliding doorstop 100 can comprise a body having a substantially sinusoidal cross sectional shape. By way of a non-limiting example, the body can be shaped as a wave defined by a substantially sinusoidal function with global maximums and global minimums on opposing sides of the body, and a local minimum within the interior of the body at a height between the heights of the global maximums and global minimums.

As shown in FIGS. 1A and 1B, the body member can have a first end 102, a first hump 104, a central trough 106, a second hump 108, and a second end 110. The first end 102 and the second end 110 can be at opposing side edges of the gliding doorstop 100. The first hump 104 can be between the first end 102 and the central trough 106, and the second hump 108 can be between the central trough 106 and the second end 110. The central trough 106 can be positioned between the first hump 104 and the second hump 108.

FIGS. 1A and 1B depict views of a gliding doorstop 100 in an upright position, in which the first end 102 and the second end 110 are positioned below the first hump 104 and the second hump 108. In this upright position, at least some portions of the first end 102 and the second end 110 can be proximate to global minimums of the gliding doorstop's substantially sinusoidal shape, while at least some portions of the first hump 104 and the second hump 108 can be proximate to global maximums of the gliding doorstop's substantially sinusoidal shape. Additionally, in this upright position at least some portion of the central trough 106 can be proximate to a local minimum of the gliding doorstop's substantially sinusoidal shape. As such, the central trough 106 can be higher than the first end 102 and second end 110, but be lower than the first hump 104 and second hump 108. The description of this positioning is relative, and would be reversed if the gliding doorstop 100 was flipped from the upright position shown in FIGS. 1A and 1B.

Figure 1C:
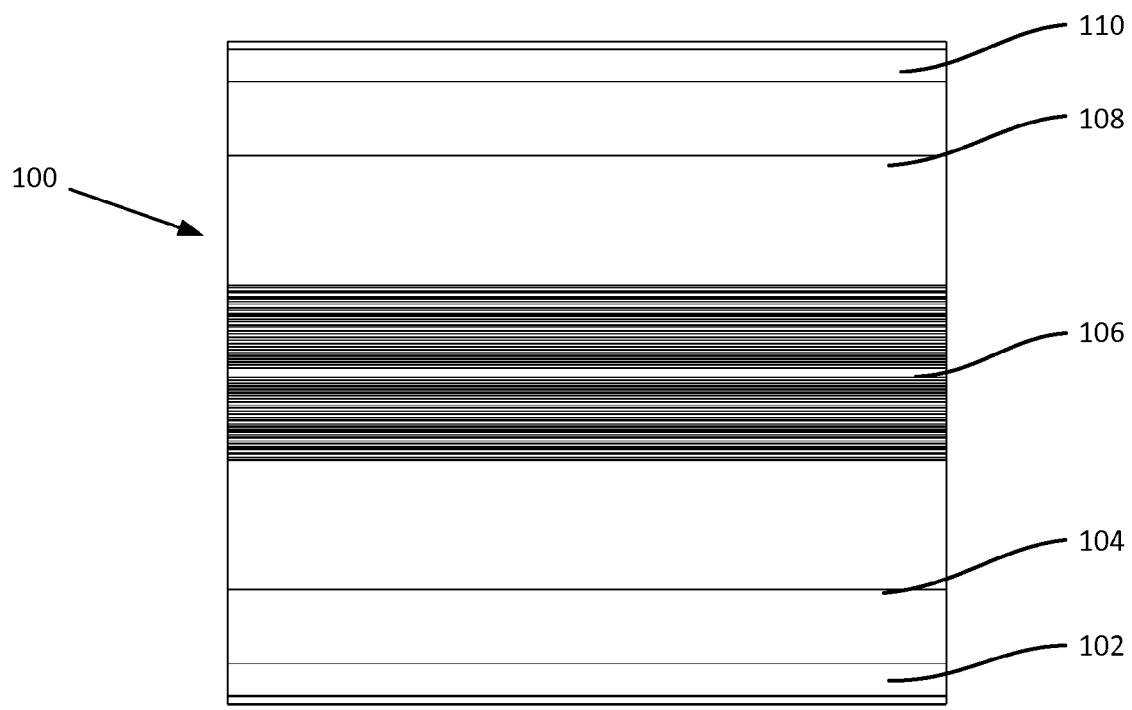
FIG. 1C depicts a top view of one embodiment of a gliding doorstop.
Figure 1D:
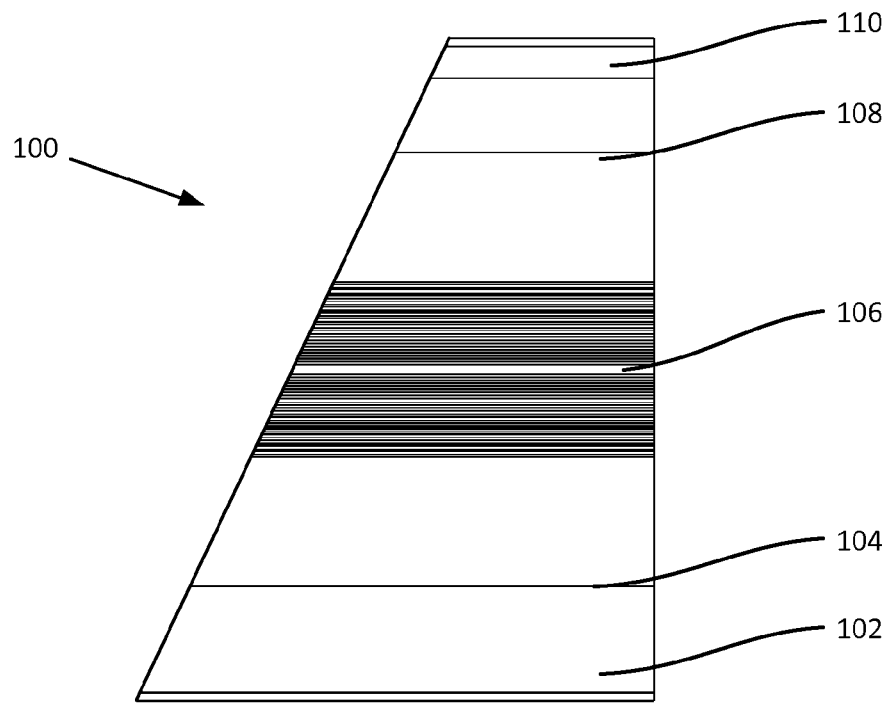
FIG. 1D depicts a top view of an alternate embodiment of a gliding doorstop.

In some embodiments, a gliding doorstop 100 can have a substantially rectangular shape when viewed from the top, as shown in FIG. 1C. In these embodiments front and back edges of the gliding doorstop 100 can be parallel, and can run orthogonally to the first end 102 and second end 110. In alternate embodiments, a gliding doorstop 100 can have a substantially triangular or wedge shape when viewed from the top, as shown in FIG. 1D. By way of a non-limiting example, a gliding doorstop 100 can have a front edge that runs orthogonally to the first end 102 and second end 110, and an opposing back edge that runs at an acute or obtuse angle relative to the first end 102 and second end 110. In still other embodiments, a gliding doorstop 100 can have a circular, oval, polygonal, curved, and/or novelty shape when viewed from the top.

In embodiments having a non-rectangular shape when viewed from the top, the gliding doorstop 100 can have at least a portion that fully extends from the first end 102 to the second end 110 and has a substantially sinusoidal cross sectional shape. By way of a non-limiting example, in the wedge-shaped embodiment shown from above in FIG. 1D, the right half can have a full substantially sinusoidal cross sectional shape as it extends from the first end 102 to the second end 110, even while different portions of the angled left half can have varying cross sectional shapes that partially span a full substantially sinusoidal shape.

The body of the gliding doorstop 100 can comprise polyethylene, polypropylene, polystyrene, polycarbonate, any other plastic, polymer, metal, metal alloy, wood, and/or any other material or combination of materials. In some embodiments, the gliding doorstop 100 can be formed as one contiguous piece of material that has been thermoformed, molded, carved, or otherwise formed to have the substantially sinusoidal cross sectional shape shown in FIGS. 1A and 1B. In alternate embodiments, smaller portions of the gliding doorstop 100 can be formed separately and the components can then be coupled together using screws, bolts, friction fit, interlocking components, adhesives, and/or any other coupling mechanism or method.

Figure 2:
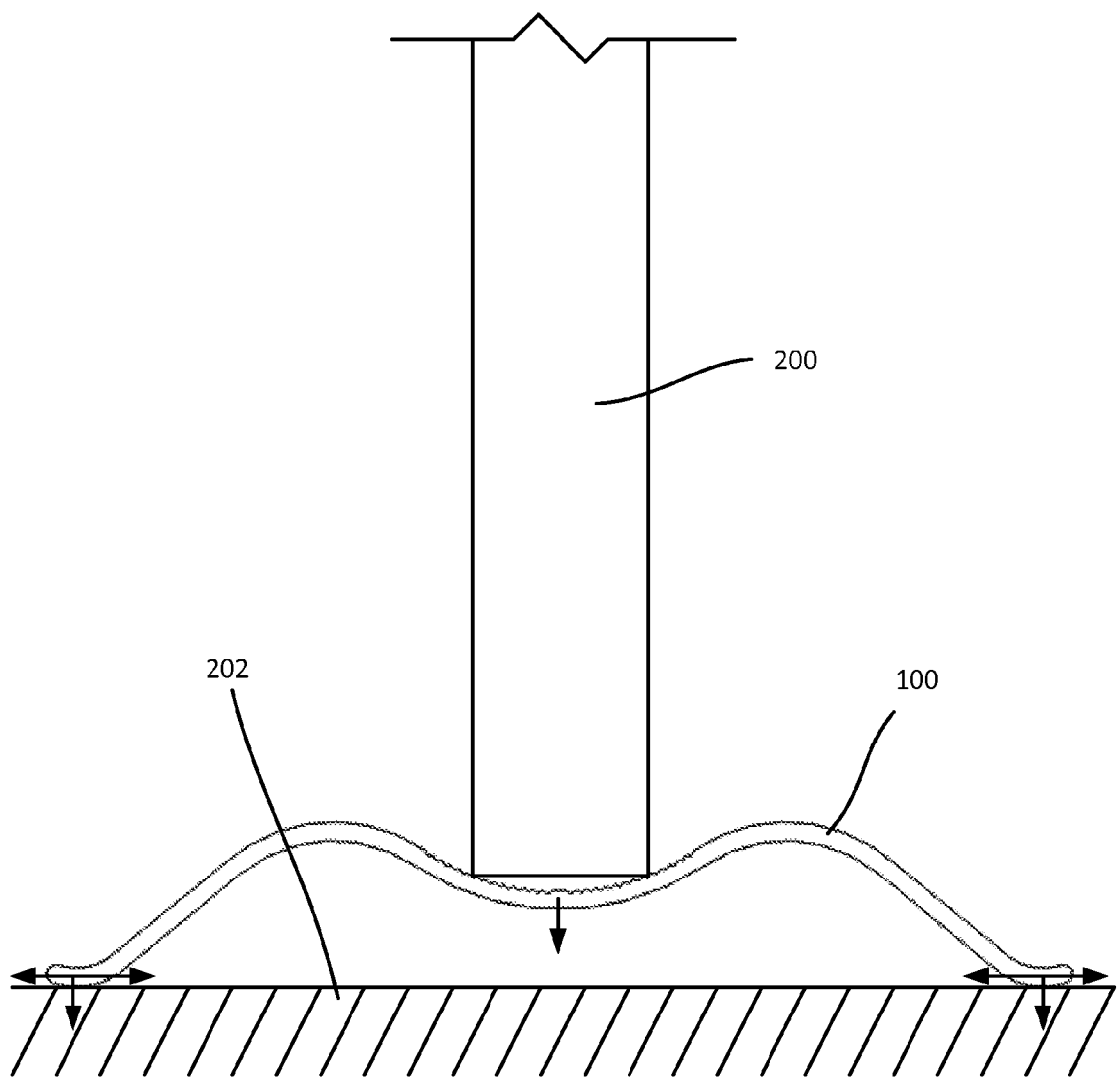
FIG. 2 depicts a side view of an embodiment of gliding doorstop in use with a door.

FIG. 2 depicts a side view of an embodiment of a gliding doorstop 100 in use with a door 200. In use, a gliding doorstop 100 can be inserted into a gap between a door 200 and a floor 202, with the bottom of the door 200 fitting into the central trough 106 between the first hump 104 and the second hump 108 as shown in FIG. 2. By way of a non-limiting example, a door 200 can be at least partially opened, a user can position the central trough 106 next to and/or underneath the door 200, and can then slide the gliding doorstop 100 beneath the door 200.

In some embodiments, the substantially sinusoidal cross sectional shape of the gliding doorstop 100 and/or the materials comprising the body of the gliding doorstop 100 can allow portions of the gliding doorstop 100 to flex or partially bend in order to fit the gliding doorstop 100 into the gap between the door 200 and floor 202. By way of a non-limiting example, in some embodiments the gliding doorstop 100 can be made of a resilient yet partially flexible plastic, such that the first hump 104 and/or second hump 108 can flex to lower the central trough 106 closer to the floor 202. This flexibility of the gliding doorstop 100 can allow a user to fit the gliding doorstop 100 into differently sized gaps beneath different doors 200. Additionally, while the gliding doorstop 100 can be flexed to position the central trough 106 underneath a door 200, thereafter the resiliency of the gliding doorstop's material and its tendency to return to its original shape can provide upward force that tends to push the central trough 106 upward against the bottom of the door 200.

Figure 3:
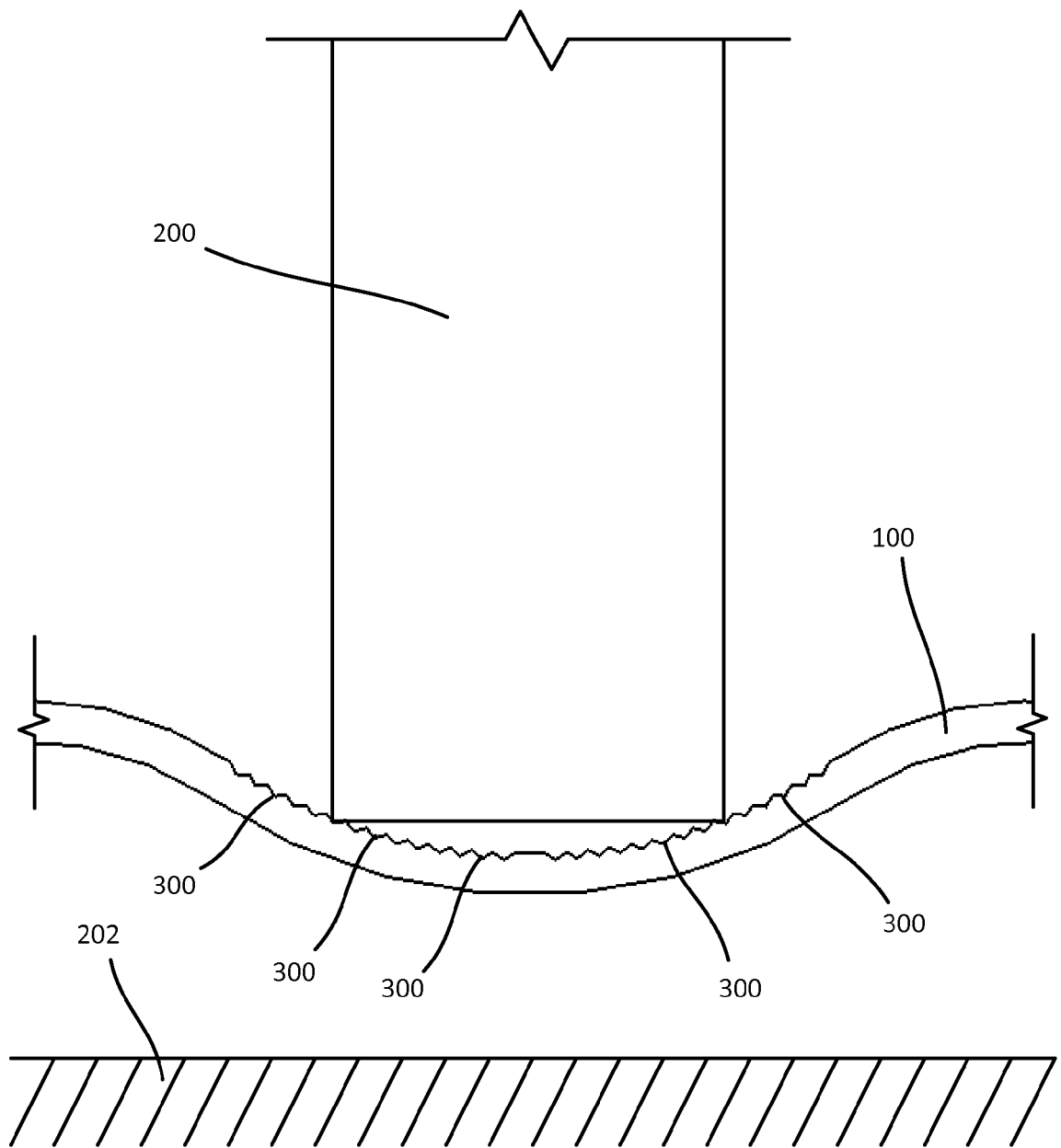
FIG. 3 depicts a close up side view of a central portion of an embodiment of a gliding doorstop.

FIG. 3 depicts a close up side view of a central section of a gliding doorstop 100. In some embodiments, one or more grooves 300 can at least partially extend across the upper surface of the gliding doorstop 100 proximate to the central trough 106. By way of a non-limiting example, FIG. 1A shows a plurality of grooves 300 extending through the central trough 106 from one side of the gliding doorstop 100 to the opposing side. The grooves 300 can be ridges, notches, steps, and/or troughs formed as indentations into, and/or protrusions from, the upper surface of the gliding doorstop 100. The grooves 300 can be configured such that the bottom corners of a door 200 can notch into, and/or rest within, grooves 300. The grooves 300 can assist in keeping the bottom edge of the door 200 within the central trough 106 via a friction fit even when the door 200 and gliding doorstop 100 are moved from side to side as will be described below.

In some embodiments, a plurality of grooves 300 can be spaced throughout the central trough 106, such that the gliding doorstop 100 can be installed on doors 200 of different thicknesses by using appropriate grooves 300 for the door's thickness. By way of a non-limiting example, a thicker door 200 can notch into grooves 300 that are farther apart within the central trough 106, while a thinner door 200 can notch into grooves 300 that are closer together within the central trough 106. In some embodiments, the grooves 300 can be shaped as stairs that have stepped surfaces that are substantially parallel and perpendicular to the plane of the floor 202 when the gliding doorstop 100 is resting on the floor 202 and is not being flexed. In other embodiments, the grooves 300 can be shaped with surfaces that are diagonal relative to the plane of the floor 202 when the gliding doorstop 100 is resting on the floor and is not being flexed. In still other embodiments, teeth, grips, clamps, dimples, textured surfaces, and/or any other connecting or retaining mechanism can be used in place of, or in addition to, the grooves 300 to assist in keeping the bottom edge of the door 200 within the central trough 106. In alternate embodiments, a gliding doorstop 100 can be permanently or temporarily fixed to a door 200 using screws, bolts, nails, adhesives, or any other fastener.

Figure 4:
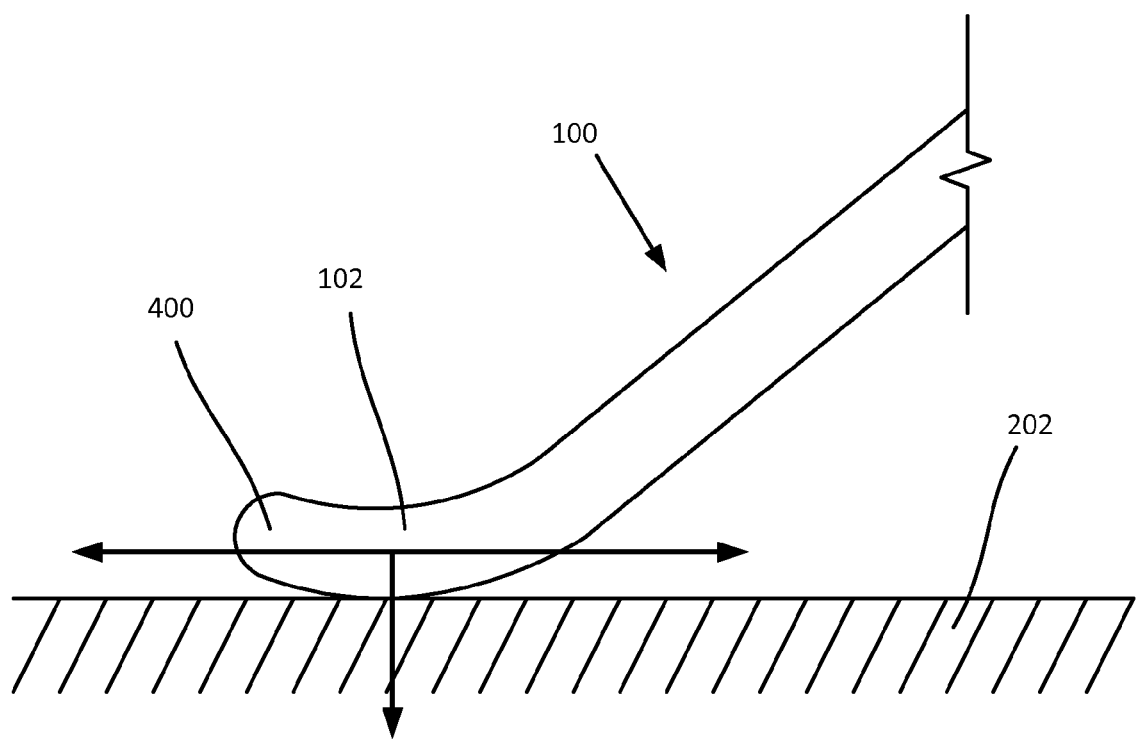
FIG. 4 depicts a close up side view of an end of an embodiment of a gliding doorstop.

FIG. 4 depicts a close up side view of an end of a gliding doorstop 100. FIG. 4 depicts an embodiment of the first end 102, however the second end 110 can have substantially the same shape as the first end 102 in a mirrored configuration. In some embodiments the first end 102 and second end 110 can each have a raised lip 400. The raised lips 400 can be at the outermost edges of the gliding doorstop 100, and be formed to be curved up and away from the global minimums of the gliding doorstop's substantially sinusoidal shape, as shown in FIG. 4. The bottom surfaces of the first end 102 and second end 110, at the gliding doorstop's global minimums, can be configured to contact the floor 202, while the raised lips 400 can be curved up and away such that they are higher than the floor 202, as shown in FIG. 4.

Returning to FIG. 2, when the gliding doorstop 100 is installed in a gap between a door 200 and a floor 202, the force applied by the door 200 against the central trough 106 can be transferred through the first hump 104 and second hump 108 into the first end 102 and second end 110, such that the gliding doorstop 100 applies a downward normal force against the floor 202. This downward normal force can increase the horizontal frictional resistance between the gliding doorstop 100 and the floor 202.

The horizontal frictional resistance between the gliding doorstop 100 and the floor 202 can be sufficient to prevent most undesired movement of the door 200. By way of a non-limiting example, the horizontal forces exerted on the door 200, and thereby on the gliding doorstop 100 through the interactions between the door 200 and the gliding doorstop's central trough 106, by routine amounts of wind, passing air currents, or light nudges can be insufficient to overcome the horizontal frictional resistance forces between the gliding doorstop 100 and floor 202, such that the gliding doorstop 100 and door 200 can remain in a desired position.

However, the curved shapes of the raised lips 400 and the undersides of first end 102 and second end 110 can assist in allowing the gliding doorstop 100 to slide along a floor 202 more easily than conventional doorstops when pushed by a user. Because the first end 102 and second end 110 have raised lips 400, and the undersides of the first end 102 and second end 110 are curved, relatively small surface areas at the global minimums of the gliding doorstop's substantially sinusoidal shape can be in contact with the floor 202. The first end 102 and second end 110 can thus have a coefficient of friction such that the frictional resistance force between the gliding doorstop 100 and the floor 202 can be overcome by a user intentionally exerting force horizontally on the door 200. When the user moves the door 200 to a new desired position and removes the horizontal force, the frictional resistance of the gliding doorstop 100 can again resist routine levels of environmental forces and keep the door 200 in its new position.

As such, the gliding doorstop 100 can retain a door 200 in a set position against most routine amounts of environmental forces, but still allow a user to push or pull the door 200 into a new set position without removing the gliding doorstop 100. By way of a non-limiting example, a gliding doorstop 100 installed under an interior door 200 can keep the interior door in place despite air currents caused by people walking by or forces from light nudges, but allow a user to move the interior door 200 by applying enough manual pressure to the door 200 to overcome the frictional resistance forces between the gliding doorstop 100 and the floor 202 and thereby sliding the gliding doorstop 100 while the gliding doorstop 100 is still in place under the door 200. By way of a non-limiting example, a user can choose to move a door 200 from a set position in which it is kept fully opened to a new set position that is partially closed when the weather or temperatures change, without removing the gliding doorstop 100 from under the door 200. By way of another non-limiting example, the gliding doorstop 100 can be used to keep a door 200 in a particular set position and prevent it from moving unexpectedly due to wind, while still allowing users to manually move the door 200 at any time without removing the gliding doorstop 100 due to the gliding doorstop's slidable shape.

Figure 5:
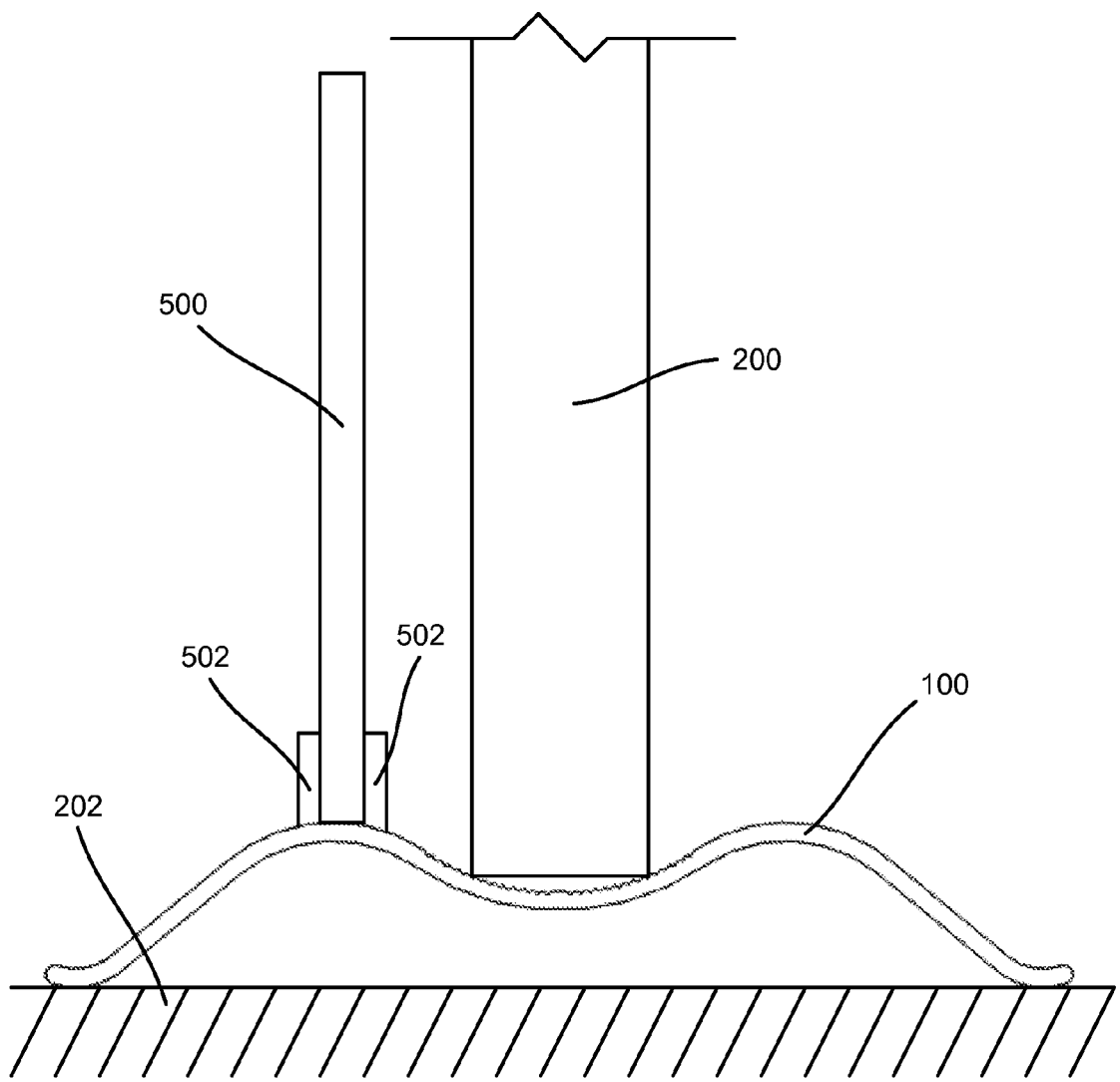
FIG. 5 depicts a side view of an embodiment of a gliding doorstop with a doorstop attachment.

FIG. 5 depicts a side view of an embodiment of a gliding doorstop 100 that further comprises a doorstop attachment 500. In some embodiments, one or more doorstop attachments 500 can be permanently or removably coupled with the gliding doorstop 100. Doorstop attachments 500 can be decorative and/or functional components. In various embodiments, a doorstop attachment 500 can be a pet device, a sign, a piece of art, a sculpture, a toy, a cleaning device, a mirror, a brush or shoe cleaning device, an electronic component such as a light, nightlight, motion detector, sensor, or screen, or any other component or device. By way of a non-limiting example, a doorstop attachment 500 can be a cat scratching device 600 as described below with respect to FIGS. 6A-6B.

In some embodiments, the gliding doorstop 100 and/or doorstop attachment 500 can comprise one or more attachment connection mechanisms 502 that can permanently and/or selectively couple the doorstop attachment 500 with the gliding doorstop 100. By way of a non-limiting example, FIG. 5 depicts an embodiment in which the attachment connection mechanisms 502 are two protrusions that extend from the upper surface of the gliding doorstop 100 to define a slot into which a portion of a doorstop attachment 500 can be inserted and held in place via friction fit. In other embodiments, the attachment connection mechanisms 502 can be holes, hook and loop fasteners, notches, grooves, clips, interlocking pieces, magnets, screws, bolts, adhesives, and/or any other connection mechanism. In alternate embodiments, the attachment connection mechanisms 502 and/or doorstop attachments 500 can be absent.

As shown in FIG. 5, in some embodiments a doorstop attachment 500 can be coupled with the gliding doorstop 100 proximate to the top of the first hump 104 or second hump 108. In other embodiments, doorstop attachments 500 can be coupled with the gliding doorstop 100 at the first end 102 or the second end 110, at a raised lip 400, at a portion between the first end 102 and the first hump 104 or between the second end 110 and the second hump 108, at a position between the first hump and the central trough 106 or between the second hump 108 and the central trough 106, or at any other position on the gliding doorstop 100.

In some embodiments a doorstop attachment 500 can be coupled with the gliding doorstop 100 such that it extends away from the gliding doorstop 100 at a direction substantially parallel to a door 200 in place within the central trough 106. In other embodiments a doorstop attachment 500 can be coupled with the gliding doorstop 100 such that it extends away from the gliding doorstop 100 toward or away from a door 200 in place within the central trough 106.

Figure 6A:
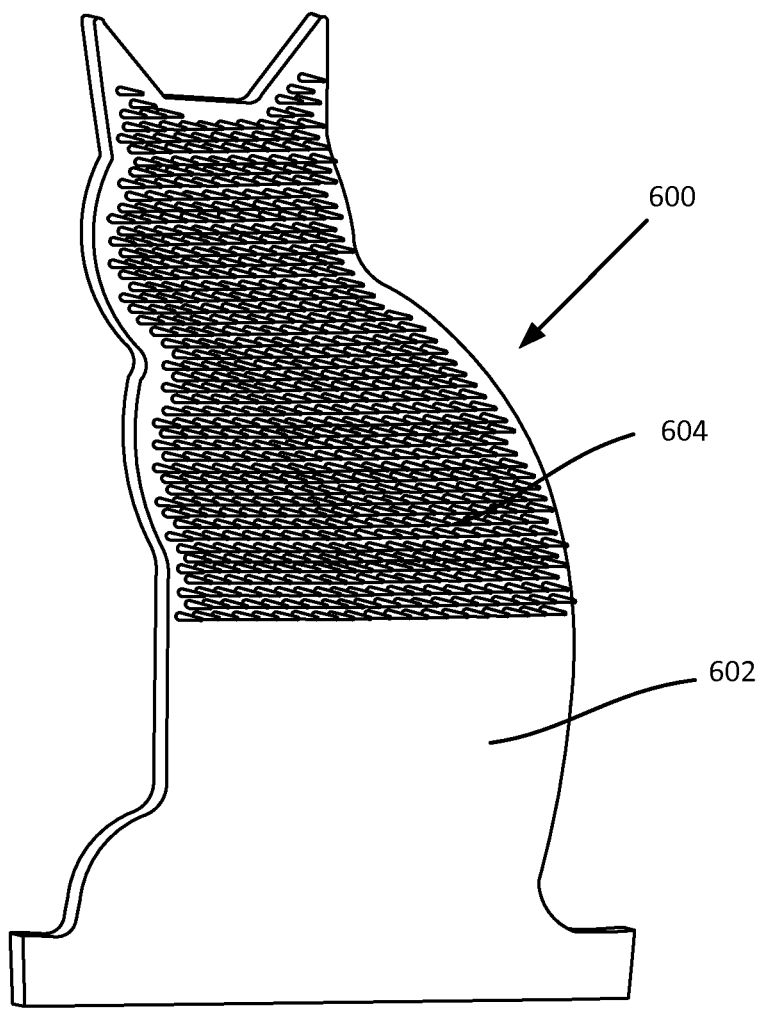
FIG. 6A depicts an exemplary embodiment of a doorstop attachment, in which the doorstop attachment is a cat scratching device.

FIG. 6A depicts one non-limiting exemplary embodiment of a doorstop attachment 500, in which the doorstop attachment 500 is a cat scratching device 600. As shown in FIG. 6A, a cat scratching device 600 can comprise a body panel 602 with an at least partially textured surface 604. The body panel 602 can be a structure comprising plastic, wood, metal, or any other material or combination of materials. In some embodiments the body panel 602 can have a novelty shape such as the shape of a cat's silhouette, as shown in FIG. 6A. In other embodiments the body panel 602 can be rectangular, polygonal, curved, or have any other desired shape.

The textured surface 604 can cover at least a portion of one or more faces of the body panel 602. By way of a non-limiting example, FIG. 6A depicts an embodiment in which the top half of the body panel 602 is substantially covered with a textured surface 604, however in other embodiments the textured surface 604 can cover the full body panel 602 or cover one or more other areas of the body panel 602.

Figure 6B:
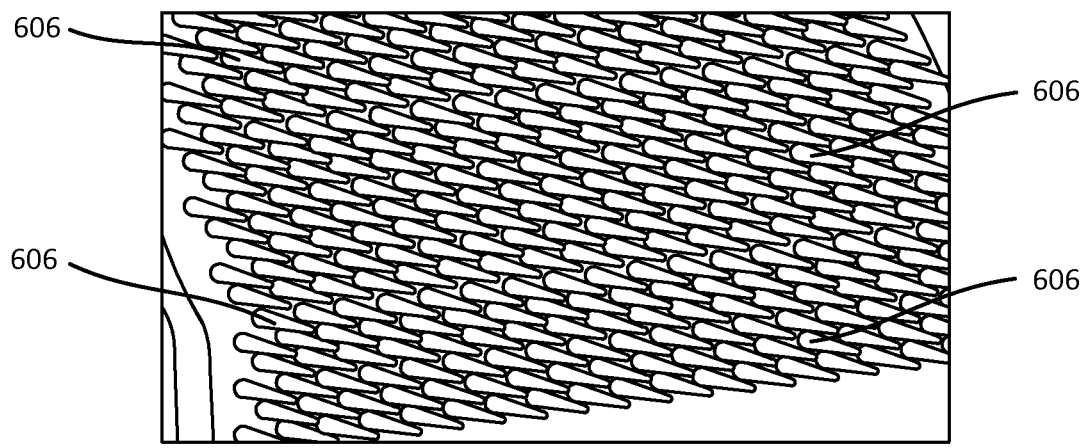
FIG. 6B depicts a close up partial view of an exemplary embodiment of a cat scratching device.

In some embodiments, the textured surface 604 can comprise a plurality of protrusions 606, as shown in the close-up partial view of FIG. 6B. The protrusions 606 can be conical, tubular, rectangular, have the same or varying lengths, and/or have any other shape or size. In some embodiments the protrusions 606 can comprise a flexible material such as rubber or silicone, while in other embodiments the protrusions 606 can comprise more rigid material such as plastic, metal, or wood. In alternate embodiments the textured surface 604 can comprise carpet, sisal, cardboard, and/or any other material or texture.

In use, the cat scratching device 600 can be mounted on a gliding doorstop 100 as a doorstop attachment 500, as shown in FIG. 5. By way of a non-limiting example, the bottom edge of the cat scratching device 600 can be coupled with the gliding doorstop 100 using one or more attachment connection mechanisms 502, such as fitting into a slot formed by the protrusions shown in FIG. 5. The cat scratching device 600 can extend upward from the gliding doorstop 100 and be parallel to, angled toward, or angled away from, a door 200 held within the gliding doorstop's central trough 106. The cat scratching device's body panel 602 and/or textured surface 604 can be shaped and/or textured such that a cat can rub itself against the edges of the body panel 602 and/or against the textured surface 604 to scratch an itch or mark its territory when the cat scratching device 600 is mounted on the gliding doorstop 100.

As described above, a gliding doorstop 100 can remain in place below a door 200 despite a user's manual movement of the door 200. The cat scratching device 600 can remain connected to the gliding doorstop 100 as it is moved, thereby keeping the cat scratching device 600 available for a cat to scratch on or rub against regardless of the positioning of the door 200. Similarly, any other type of doorstop attachment 500 can be permanently or selectively installed on a gliding doorstop 100 and can remain visible and/or functional regardless of the positioning of the door 200 and the gliding doorstop 100.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A gliding doorstop, comprising:
a body member having a cross section with a substantially sinusoidal shape, the body member having a first end, a first hump, a central trough, a second hump, and a second end; and
a doorstop attachment coupled with said body member;
wherein an upper surface of said central trough is shaped to accept the bottom of a door when bottom surfaces of said first end and said second end are in contact with a floor below the door.

2. The gliding doorstop of claim 1, wherein:
said first end and said second end are at global minimums of said substantially sinusoidal shape,
said first hump and said second hump are at global maximums of said substantially sinusoidal shape, and
said central trough is at a local minimum of said substantially sinusoidal shape.

3. The gliding doorstop of claim 2, wherein said first end and said second end are curved such that said global minimums are configured to contact the floor when said central trough accepts the bottom of a door, and contact of said first end and said second end at said global minimums against the floor provides frictional resistance to horizontally moving said body member sufficient to hold said body member in a set position until a user manually overcomes said frictional resistance to horizontally move said body member.

4. The gliding doorstop of claim 2, wherein said first end and said second end each have a lip at least partially raised relative to said global minimums.

5. The gliding doorstop of claim 1, wherein said body member comprises a resilient material such that said body member is configured to flex to lower said central trough relative to said first end and said second end during installation of said body member between a door and a floor, and thereafter provide pressure against the door and the floor while the body member is in place between the door and the floor.

6. The gliding doorstop of claim 1, wherein a plurality of grooves at least partially extends through an upper surface of said central trough, said plurality of grooves being arranged such that bottom corners of a door can be notched into selected grooves within said plurality of grooves.

7. The gliding doorstop of claim 1, wherein said body member has opposing parallel edges that each run orthogonally to said first end and said second end.

8. The gliding doorstop of claim 1, wherein said body member has a first edge running orthogonal to said first end and said second end, and an opposing second edge running at an angle between said first end and said second end.

9. The gliding doorstop of claim 1, wherein said doorstop attachment is selectively coupled with one or more attachment connection mechanisms on said body member.

10. The gliding doorstop of claim 1, wherein said doorstop attachment is coupled with said body member at a position on said first hump.

11. The gliding doorstop of claim 1, wherein said doorstop attachment is a cat scratching device comprising a body panel at least partially covered with a textured surface.

12. The gliding doorstop of claim 11, wherein said body panel is shaped as a cat silhouette.

13. The gliding doorstop of claim 11, wherein said textured surface comprises a plurality of protrusions extending from said body panel.

\* \* \* \* \*